United States Patent
Potts et al.

(10) Patent No.: US 6,425,697 B1
(45) Date of Patent: Jul. 30, 2002

(54) UNIVERSAL CAMERA MOUNTING ASSEMBLY

(76) Inventors: Jeff C. Potts, 1715 Elkin Rd.; Richard M. Allen, 1151 Lafayette Blvd., both of Winchester, KY (US) 40391

( * ) Notice: Subject to any disclaimer, the term of this patent is extended or adjusted under 35 U.S.C. 154(b) by 0 days.

(21) Appl. No.: 09/524,649

(22) Filed: Mar. 13, 2000

Related U.S. Application Data

(60) Provisional application No. 60/124,749, filed on Mar. 17, 1999.

(51) Int. Cl.[7] .......................... G03B 17/00; F41C 27/00
(52) U.S. Cl. ...................... 396/426; 396/419; 352/243; 42/106
(58) Field of Search .................................. 396/419, 420, 396/426, 429, 7, 12, 13, 421, 422; 42/106; 352/243

(56) References Cited

U.S. PATENT DOCUMENTS

| | | | |
|---|---|---|---|
| 116,765 A | | 7/1871 | Sloan |
| 1,190,000 A | | 7/1916 | Pfander |
| 2,943,547 A | | 7/1960 | Martin |
| 3,062,114 A | * | 11/1962 | Palos |
| 3,273,484 A | | 9/1966 | Lapsley |
| 3,427,102 A | | 2/1969 | Wade |
| 3,545,356 A | | 12/1970 | Nielsen |
| 4,206,983 A | * | 6/1980 | Nettman et al. |
| 4,309,095 A | | 1/1982 | Buckley |
| 4,398,815 A | | 8/1983 | Barzee et al. |
| 4,685,649 A | * | 8/1987 | McKay |
| 4,835,621 A | | 5/1989 | Black |
| 4,976,387 A | | 12/1990 | Spianti |
| 5,360,196 A | | 11/1994 | DiGiulio |
| 5,721,997 A | | 2/1998 | Powell et al. |

\* cited by examiner

*Primary Examiner*—Russell Adams
*Assistant Examiner*—Arthur A Smith
(74) *Attorney, Agent, or Firm*—King & Schickli, PLLC

(57) ABSTRACT

A camera mounting assembly for a weapon is provided. The mounting assembly includes a mount for direct attachment to the weapon. A parallelogram linkage includes a pair of depending swing arms, each of which is pivotally secured at one end in the mount and at the opposite end in a camera support. The support also includes a transverse slot for receiving a stud or other mount carried by a camera. When the weapon is discharged, the swing arms allow the camera and support to together swing to and fro in response to the forces generated. During this swinging motion, the support and hence the camera are both maintained substantially aligned with the line-of-sight of the weapon at all times, thereby ensuring that the shoot is reliably captured. Dampers may also be provided to dampen the swinging motion of the camera created upon discharge. The combination of the swinging and damping improves the capture of the shoot by reducing the effects of the recoil or discharge forces. Also, since the camera is not in direct contact with the weapon, the potential for shock damage is significantly reduced.

19 Claims, 6 Drawing Sheets

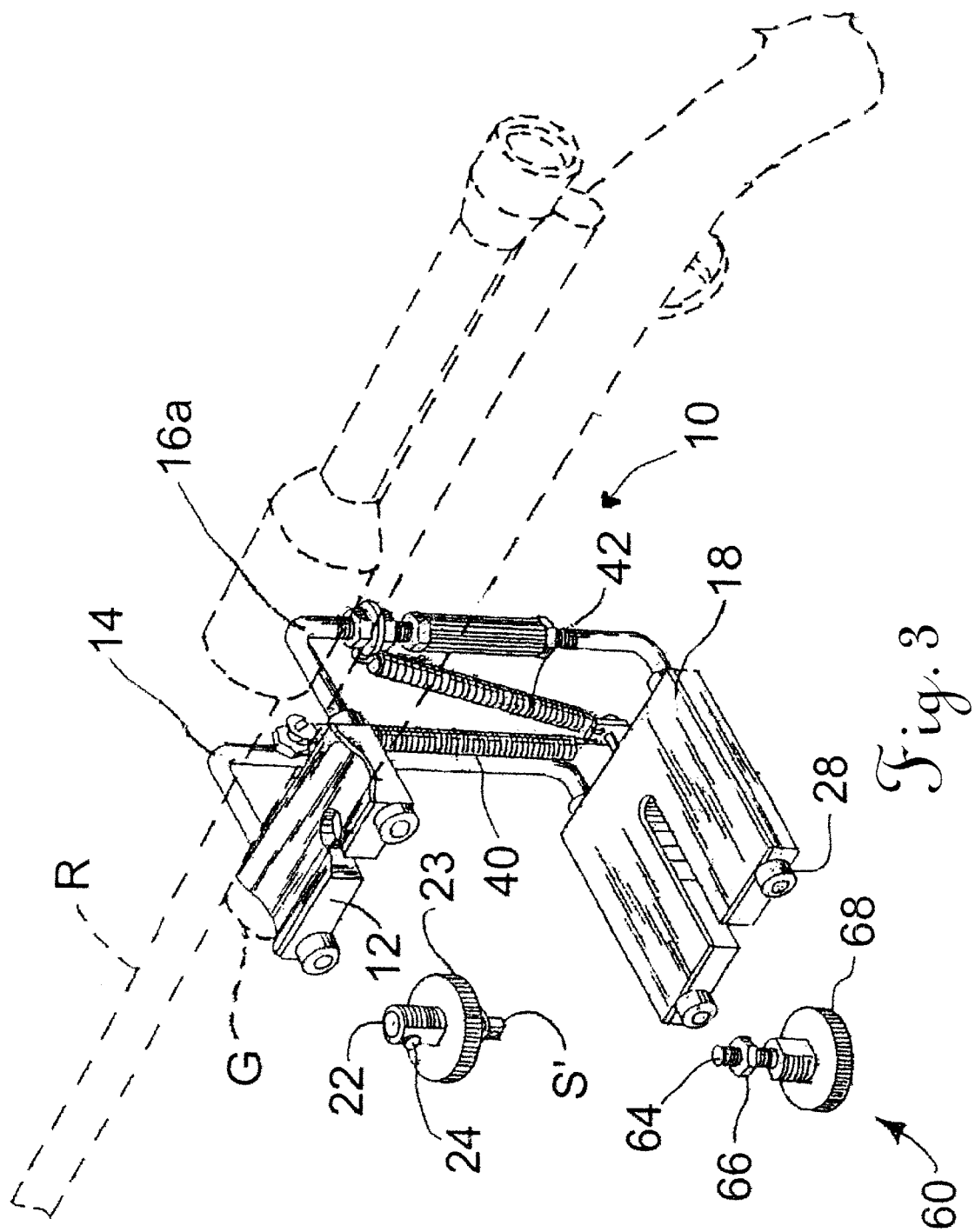

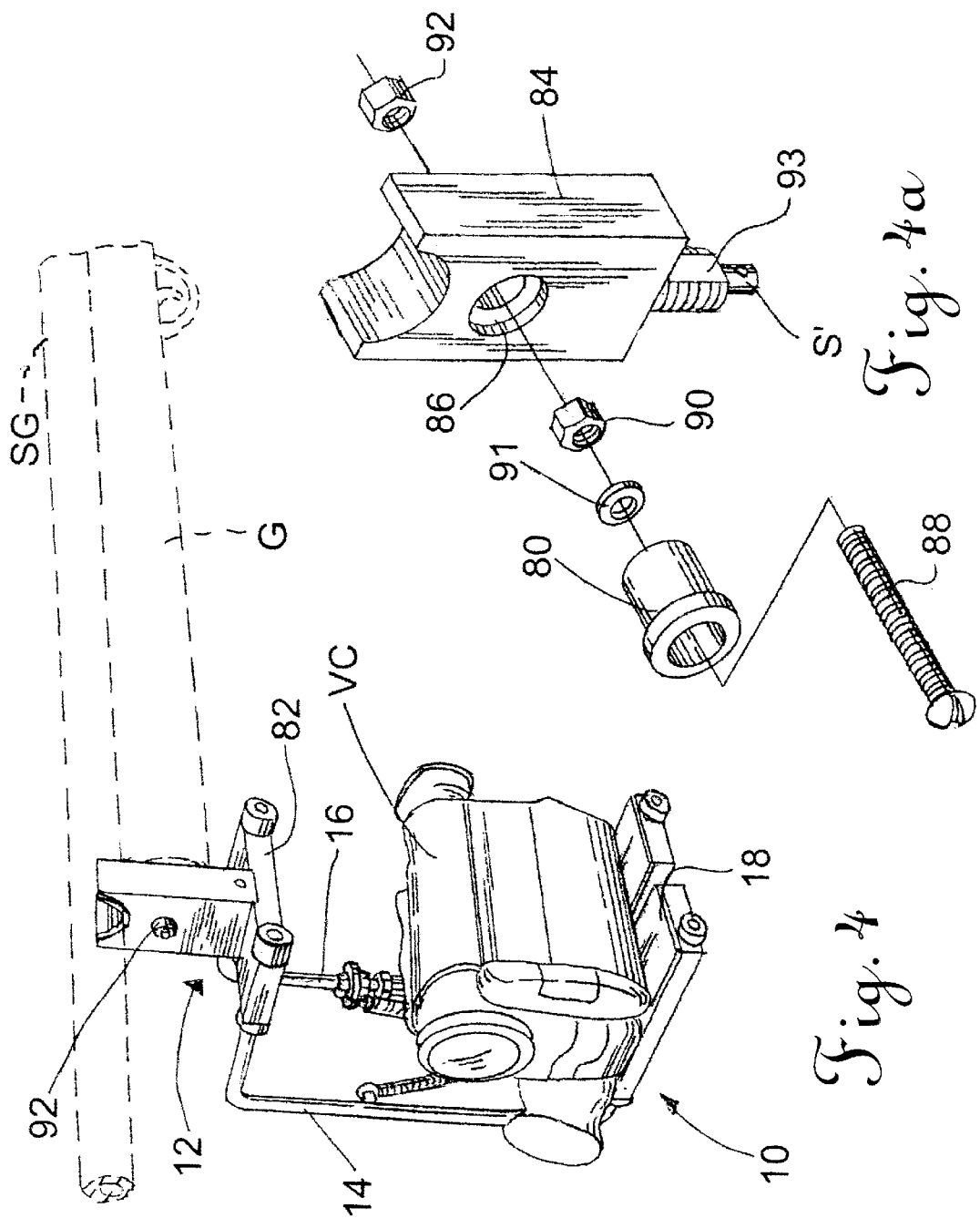

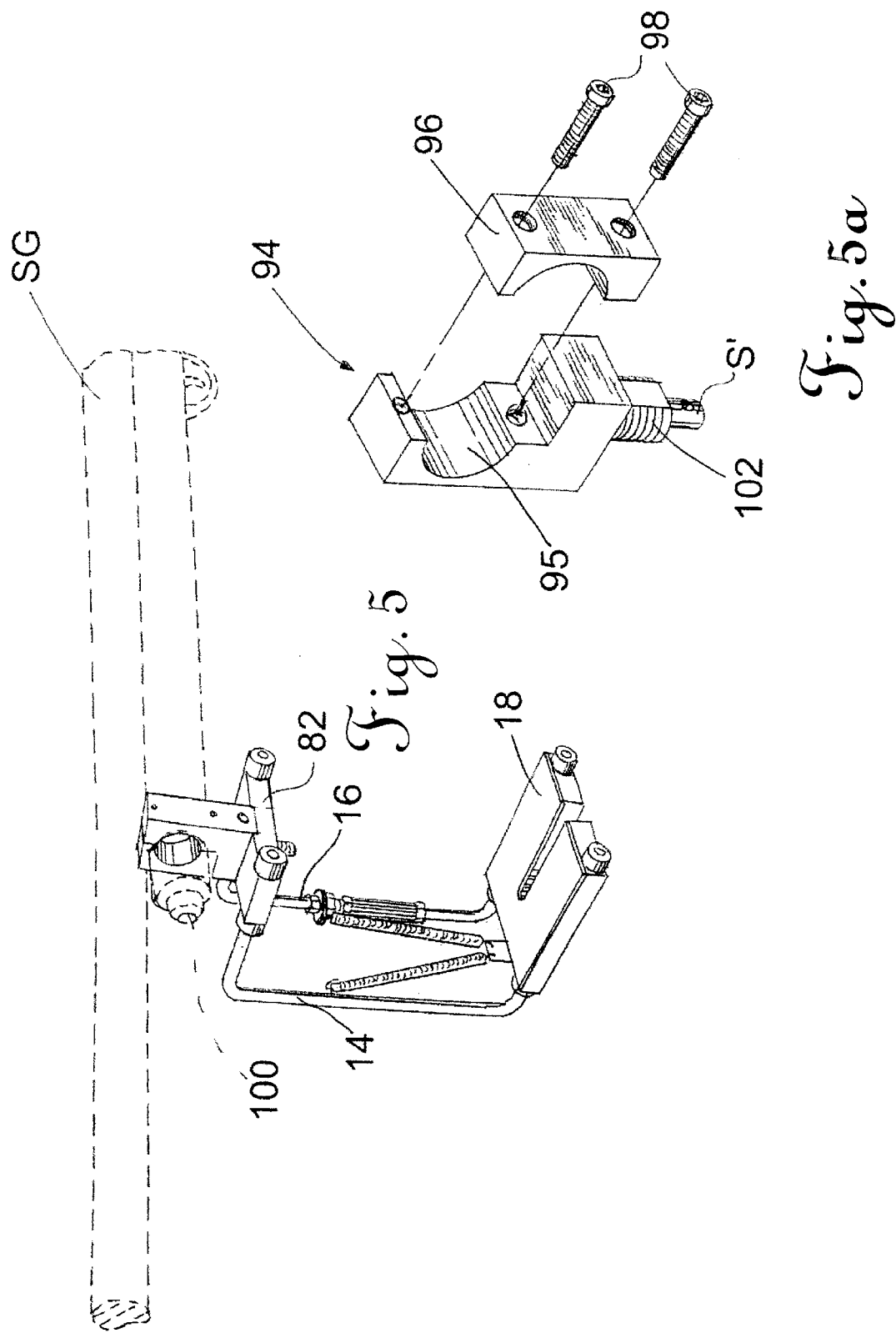

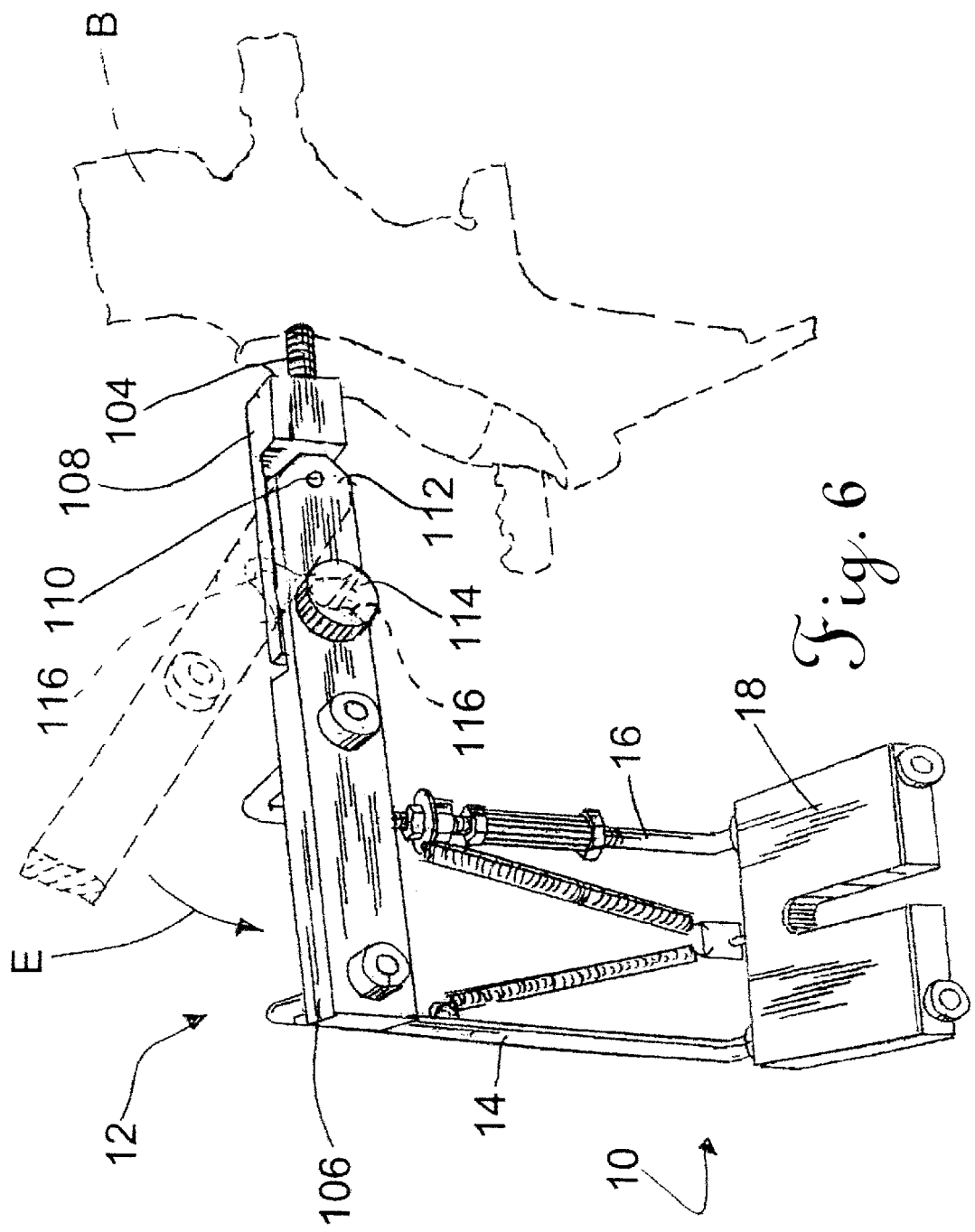

UNIVERSAL CAMERA MOUNTING ASSEMBLY

This application claims benefit of provisional application 60/124,749 filed Mar. 17, 1999.

TECHNICAL FIELD

The present invention relates generally to mounts for cameras or the like and, more particularly, to an improved universal mounting assembly for supporting a camera, such as a movie or video camera, from a structure or other object, such as a weapon.

BACKGROUND OF THE INVENTION

When hunting wild game, it is often desirable to record the shoot on film, such as through the use of a movie or video camera. Obtaining such a record of the hunt allows the hunter to later review his or her shots and receive valuable feedback, particularly when the selected target is missed. Additionally, after group hunts, reviewing the film with the other members of the hunting party is entertaining and builds camaraderie by allowing the hunters to discuss both the big kills and the "one that got away."

However, it should be recognized that it is extraordinarily difficult, if not impossible, for a single hunter to both accurately aim and discharge a firearm or other weapon while simultaneously holding a camera on the target. To solve this problem, others in the past have proposed devices for mounting a movie, video, or even still camera to a firearm to capture a single shot or the entire shoot on film. Unfortunately, all of these devices suffer from significant drawbacks. For instance, U.S. Pat. No. 1,190,000 to Pfander, U.S. Pat. No. 2,943,547 to Martin, and U.S. Pat. No. 3,427,102 to Wade all disclose stationary mountings for securing a camera directly to a firearm. The most significant disadvantage of such stationary mountings is that most of the shock and recoil forces resulting from the discharge of the firearm is transferred directly to the camera. In addition to disrupting or severely distorting the images recorded on film, the shock force may also damage the sensitive electronic components of the camera. Another limitation is that the mountings disclosed in these patents are specially adapted for use only on firearms, and in particular rifles, and are not suitable for use on bows, crossbows, or other types weapons.

Recognizing the limitations of such stationary firearm mountings, U.S. Pat. No. 3,062,114 to Palos discloses an active mounting for supporting a camera from a rifle. The camera is connected directly to the rifle using mating mounting plates that slide relative to each other. To dampen this relative movement, a spring is provided in a channel formed between the plates. The camera includes a dovetail for mating with a groove formed in the lower plate to secure it in a position parallel to the lower mounting plate. Thus, when the gun is discharged, the relative movement of the plates in combination with the biasing force supplied by the spring is designed to reduce to recoil or shock effects.

Although this mounting results in an improvement over stationary mountings and absorbs some of the recoil force created when the rifle is discharged, significant limitations still remain. One limitation is that the camera is still directly connected to the rifle and, thus, experiences the deleterious shock force generated upon discharge. A second limitation is that the mounting includes a specialized plate for direct attachment to the firearm using bolts or screws. Not only is such a mounting difficult and time consuming to install, but it also may not readily adapt for use on different types or styles of rifles, or on other weapons, such as bows. Moreover, a specialized camera or housing is required, since the camera forms an integral part of the assembly by virtue of the dovetail. Finally, the fixed mounting plate does not permit the position of the camera relative to the line of sight of the firearm to be adjusted. All of these disadvantages greatly complicate the mounting process, and in the case of rifles or other firearms, result in poor capture of the shoot on film due to the transfer of shock forces or the potential for camera misalignment.

Thus, a need is identified for an improved arrangement for mounting a camera, and in particular a video camera, to an object, such as a weapon or other structure that is subjected to significant, but usually intermittent, shock forces. The mounting would easily attach to existing structures found on many objects or weapons, and thus, would not require extensive installation time or retrofitting. Active, full support would be provided without directly connecting the camera to the weapon. This would of course reduce the effect of both the shock and recoil forces on the camera when the weapon is discharged, which in turn reduces distortion in the capture of the shoot on film and lessens the potential for damage to sensitive camera components or circuitry. The mounting would be adapted for use with all conventional types of cameras, thereby avoiding the need for specialized cameras, adaptors, or housings. Additionally, the mounting would be adjustable for fine tuning the camera alignment to ensure that it corresponds to the line of sight of the weapon and fully captures the shoot or other event.

SUMMARY OF THE INVENTION

Accordingly, keeping the above needs in focus, it is a primary object of the present invention to provide a camera mounting assembly for a weapon that overcomes the limitations and disadvantages of the prior art mountings described above.

Another object of the present invention is to provide a camera mounting assembly having a unique suspension system that keeps the camera substantially aligned with the line-of-sight of the weapon at all times, while simultaneously absorbing substantially all of the shock or recoil force created upon discharge, thereby preventing any substantial interruption in the capture of the shoot on film and reducing the potential for shock damage to the camera.

Still another object of the present invention is to provide a camera mounting assembly wherein the camera is indirectly connected to the weapon, thereby significantly reducing the amount of shock or recoil force transferred to the camera upon discharge.

A further object of the present invention is to provide a camera mounting assembly adapted for attachment to structures typically found on conventional weapons to permit easy and convenient installation and avoid the need for installing a specialized mounting plate on the weapon or other extensive retrofitting procedures.

Yet a further object of the present invention is to provide a camera mounting assembly having a camera support adapted for connection to conventional cameras, including home video cameras, thereby avoiding the need for a specialized camera, complicated camera adaptor, or the use of a separate housing for mounting the camera.

Still a further object of the present invention is to provide a camera mounting assembly wherein the position or alignment of the camera relative to the line-of-sight of the weapon is easily adjusted to ensure that the shoot or other event is reliably captured on film.

Another object of the present invention is to provide a related method of reliably capturing a shoot on film by mounting a camera on a weapon such that it swings to and fro in response to any recoil forces created upon discharge.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved assembly is provided for mounting a camera on an object, such as a weapon, and in particular, for mounting a conventional home video camera to a rifle, shotgun, bow or the like. The mounting assembly includes a novel active suspension system having at least one, and preferably a pair of swing arms that, together with one or more dampers, absorb substantially all of the recoil force created when the corresponding weapon is discharged. Advantageously, significant interruptions in the capture of the shoot on film are reduced by this active suspension system. Moreover, the swing arms create only indirect contact with the weapon, which minimizes the shock force experienced by the camera. Overall, a significant improvement in the capture of the shoot or other event on film is realized, especially when compared with stationary camera mounts known in the art.

In addition to the enhanced damping features provided by the novel suspension system, another advantage is that the present assembly is useful with a plurality of different mounts, each of which is adapted for attachment to a variety of common types of weapons. Not only does this reduce installation time, but it also avoids the need for the complicated and time-consuming retrofitting procedures characteristic of prior art mounting assemblies. Ease of installation and use is further enhanced by the provision of a universal camera support. The support preferably includes a slot for receiving a separate camera mounting subassembly carried by the camera. Advantageously, this mounting subassembly is adjustable, but is also capable of memorizing the position of the camera relative to the support. This memory feature ensures that the camera is returned to the correct aligned position upon each use. However, adjustments can easily be made if necessary to ensure that the camera is properly aligned with the line-of-sight, if necessary.

In one embodiment, the mounting assembly includes a mount for mating with an underside portion of a firearm, such as the grip of a rifle. Preferably, the upper surface of the mounting plate is contoured for receiving and mating with the grip, which is typically rounded to provide a comfortable place for hand placement. A transverse slot extends inwardly from a selected side edge of the mounting plate for receiving a corresponding mount on the firearm. On a conventional rifle, this mount is the stud commonly used to secure a sling for carrying the rifle on the shoulder of the hunter, which is typically called a "sling stud."

To ensure a secure connection between the mount/mounting plate and the rifle, an extender is provided for attachment to the sling stud. This extender is externally threaded on two opposite side faces for receiving a nut that secures the mounting plate against the grip. Flat faces on the two opposite sides of the extender are provided for engaging the corresponding sides of a slot formed in the mounting plate. Preferably, this slot includes a keyway portion for receiving the extender when the flat side faces are aligned with the sidewalls of the slot. The innermost portion of the slot is preferably oversized to allow the mounting plate to rotate about the extender once it passes through the keyway portion. This arrangement ensures that the extender remains trapped in the oversized portion and cannot be inadvertently removed, such as if the securing nut should loosen. This is because the flat faces of the extender must be manipulated into alignment to register with the sides of the transverse slot for removal. To complete the installation, the contoured upper surface of the mounting plate is aligned with the grip and the nut is threaded on the lower portion of the extender to positively secure the mounting plate against the grip.

As should be appreciated, the mount may take various forms, depending on the particulars of the selected weapon or other object to which it is attached. For example, in other alternative embodiments detailed in the description that follows, the mount includes a substantially flat plate having a transverse slot for receiving a stud projecting from either of a pair of specialized adaptors that attach to either an end cap or tube on a conventional shotgun. In yet another embodiment, the mount includes a projecting stud for direct insertion in a corresponding bore, such as that typically found in a compound bow, crossbow, or the like. Of course, in addition to the specific examples provided, other types of mounts or mounting arrangements are also possible without departing from the basic principles of the present invention.

To provide the novel indirect mounting and active suspension system that forms an important part of the present invention, the mount includes at least one, and most preferably a pair of transversely extending channels for receiving the end of the corresponding swing arm(s). Each swing arm present is journaled in the corresponding channel and held in place therein by locking collars or the like. As should be appreciated, these collars prevent the swing arms from shifting laterally, but allow them to freely rotate or pivot in the channels, as necessary to absorb and reduce the shock/recoil force acting on the camera.

From the journaled portion, the swing arms depend downwardly and then project inwardly to form a C-shape. The free ends of the inwardly projecting portions of the swing arms are connected to the camera support. More specifically, the end of each swing arm is secured in a corresponding transverse channel formed in the camera support. Locking collars positioned at both sides of the camera support capture a portion of each swing arm in the corresponding channel. As noted above, these locking collars ensure that the swing arms are prevented from shifting laterally, but still allow the journaled portions to rotate freely or pivot in the respective channels.

As should now be appreciated, the depending swing arms are held in a cantilevered position from the mount and permit the support to move to and fro, or swing, relative to the weapon. Thus, when the weapon is discharged, the recoil force is translated directly into a swinging motion, instead of simply jarring the camera, as may occur in direct or stationary mountings. Additionally, the cantilever mounting provided by the swing arms advantageously reduces the shock force acting on the camera, since it is only indirectly mounted to the weapon. Overall, an improved capture of the shot or other event on film is realized.

Although this to and fro motion is beneficial in lessening the effects of the recoil force on the camera, it should be appreciated that excessive swinging can result in a poor capture of the shoot on film. To reduce the effects of swinging and further enhance the recoil/shock force absorbing function, the most preferred embodiment of the mounting assembly includes a damper. In one embodiment, this damper includes a pair of extension springs that extend between each swing arm and the support. As described immediately below, the relative expansion and compression of these springs counters any tendency for the support to swing to and fro in response to the forces created when the weapon is discharged.

As should be appreciated, the combined action of the swing arms and dampers in this most preferred embodiment provides a unique suspension system that overcomes the disadvantages of prior art camera mountings for firearms. Upon discharge, the support is initially urged forward due to the recoil force, which moves the firearm rearwardly. As this occurs, the spring attached to the rear swing arm expands to resist the forward motion of the support, while the spring attached to the forward swing arm compresses. Together, the resiliency of the springs prevent the support from moving forward any substantial distance and actually serves to pull it toward the rear as the rear spring recompresses and the forward spring re-expands after resisting the rearwardly acting recoil force. This causes the momentum of the support to initially shift rearwardly. As this occurs, the forward spring expands and the rearward spring compresses in a similar fashion to prevent the support from moving rearwardly. Thus, the springs together advantageously absorb substantially all of the swinging motion induced on the support by the recoil force. This ensures that the target is captured on film with a minimum of camera movement and, thus, distortion.

To mount the camera to the support, a threaded bore may be provided for receiving a mount extending from the tripod-receiving bore typically found on a conventional home video camera. Alternatively, and in the most preferred embodiment, a separate adjustable camera mounting subassembly is provided for engaging the transverse slot in the camera support. This mounting subassembly includes a nut that holds and remembers the alignment of the camera, even after it is removed from the transverse slot in the support and returned to the mounted position.

Adaptability for different types of weapons or firearms may also be provided by replacing at least one of the depending swing arms with an adjustable swing arm. In particular, to accommodate firearm grips having different slopes, the adjustable swing arm includes upper and lower L-shaped segments. The upper and lower ends of these segments align when the respective opposite ends are mounted in the corresponding transverse channels in the mounting plate and support. The corresponding ends of the swing arm segments are threaded, and a similarly threaded coupler joins these ends together to form a unitary, C-shaped swing arm. Nuts or locking collars are used to hold the coupler in the desired position.

By rotating the coupler, the relative spacing of the L-shaped segments forming the swing arm may be altered. Advantageously, this permits slight adjustments to be made to the angular position or "tilt" of the support, as may be necessary for properly aligning the camera on firearms having grips that slope towards the rear. When the desired alignment is reached, the threaded locking collars are moved into an abutting relationship with the coupler to ensure that it remains in the desired position.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming apart of the specification illustrate several aspects of the present invention and, together with the description, serve to explain the principles of the invention.

In the drawings:

FIG. 3 is a partially exploded perspective view showing the mounting assembly with a rifle shown in phantom to illustrate the environment in which this most preferred embodiment is used;

FIG. 4 is a perspective view showing the mounting assembly of the present invention including a specialized mount adapted for attachment to the forward end of the grip on a firearm;

FIG. 4a is an enlarged, exploded view of the mount shown in FIG. 4;

FIG. 5 is a perspective view of a second type of specialized mount for attachment to the forward end of the grip of a firearm;

FIG. 5a is an enlarged, partially exploded view of the mount shown in FIG. 5; and FIG. 6 is a perspective view of a third type of mount for use in supporting the mounting assembly.

Reference will now be made in detail to the present preferred embodiment of the invention, an example of which is illustrated in the accompanying drawing.

DETAILED DESCRIPTION OF THE INVENTION

Figure 1:
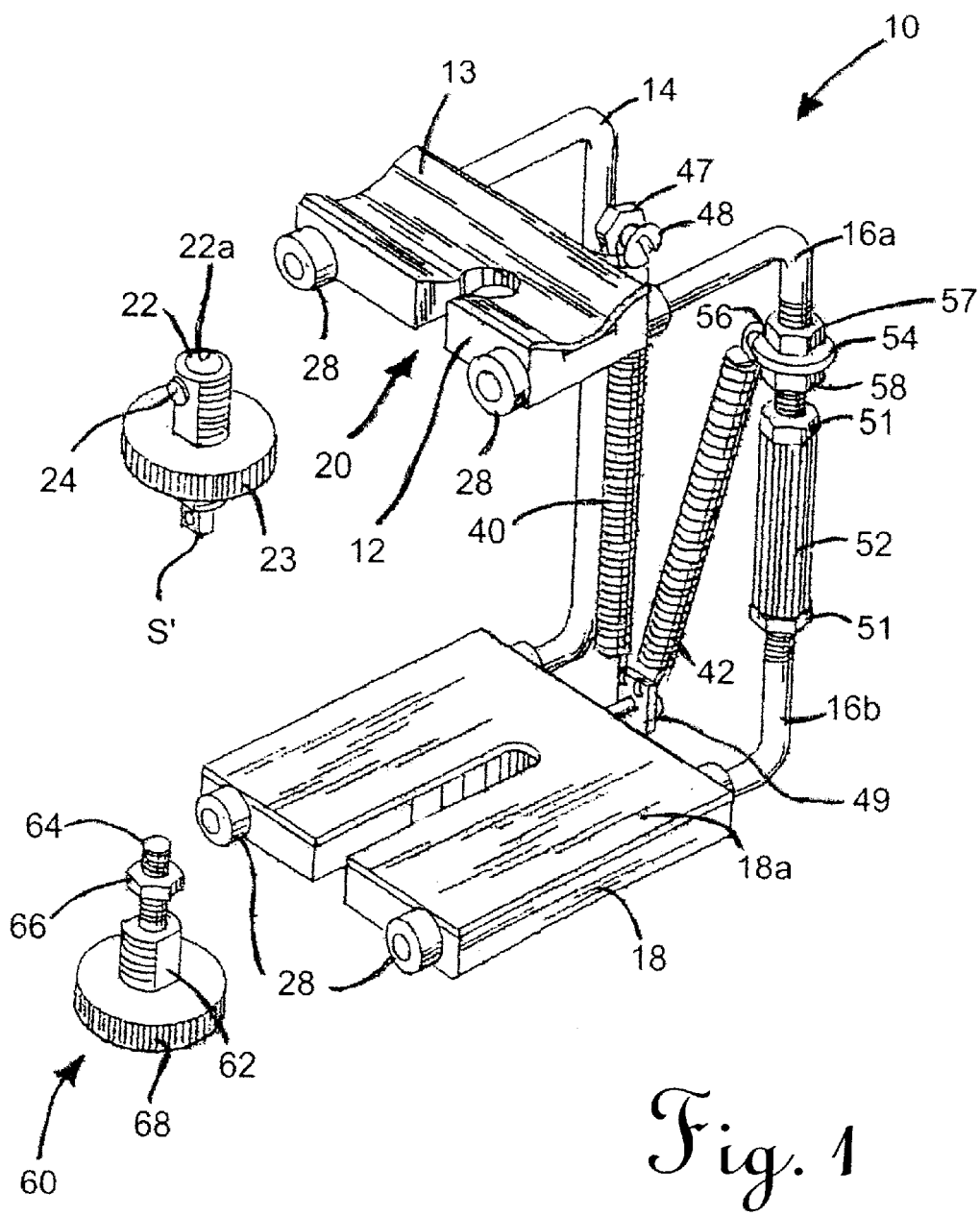
FIG. 1 is a perspective view of a most preferred embodiment of the camera mounting assembly of the present invention, including the extender for holding the mounting plate against the grip of the firearm or like structure and the adjustable camera mount for insertion in the transverse slot formed in the support.
Figure 2:
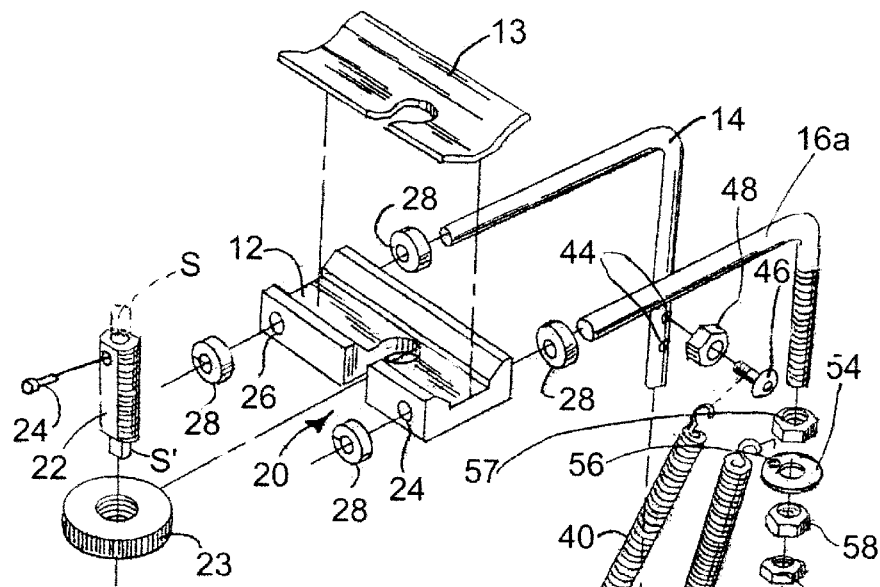
FIG. 2 is an exploded perspective view of the camera mounting assembly of FIG. 1, including the extender and the camera mount shown exploded and apart from the mounting assembly.
Figure 2:
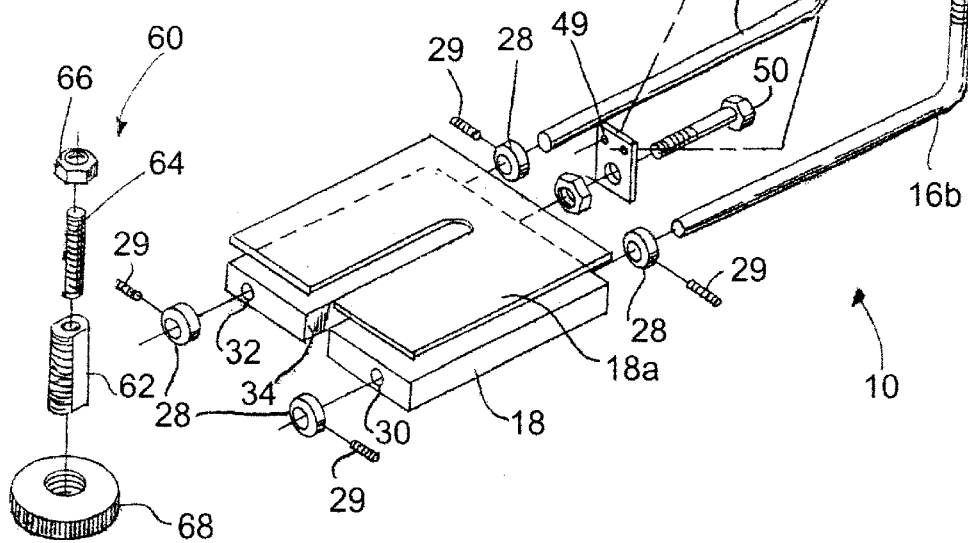

Reference is now made to FIGS. 1 and 2, which illustrate a most preferred embodiment of the camera mounting assembly 10 for use on a weapon. For purposes of illustration, the weapon is shown as a firearm, such as a conventional rifle R (see FIG. 3). It should be appreciated, however, that this rifle R is shown only for the purpose of describing a most preferred embodiment of the present invention. Those skilled in the art will realize that the mounting assembly 10 disclosed may be used on weapons other than rifles, such as for example, shotguns, bows or the like, with or without the use of the specialized mounts and mounting adaptors disclosed in the description that follows.

As shown in FIG. 1, the mounting assembly 10 includes a mount 12, a parallelogram linkage including a pair of depending swing arms 14, 16, and a support 18 in the form of a platform for supporting a movie or home video camera VC (see, e.g., FIG. 4). As illustrated, the mount 12 in this first embodiment is shown as a plate having a contoured upper surface for receiving and engaging the grip G of the rifle R (see, e.g., FIG. 3). This plate includes a transverse slot 20 for receiving an extender 22 secured to the sling stud S commonly found on firearms and, in particular, rifles. Specifically, the extender 22 includes a bore 22a for receiving the sling stud S typically provided on a conventional rifle to provide an attachment point for a shoulder strap or "sling." Upon inserting the sling stud S into this bore 22a, transverse apertures in the extender 22 align with sling-receiving apertures in the sling stud S. A threaded bolt 24 is inserted through these aligned apertures to securely hold the extender 22 in place on the sling stud S. The lower portion of the extender 22 is provided with a replacement sling stud S' for receiving the respective end of the sling when the mounting assembly 10 is secured to the rifle R. A nut 23 is also provided on the extender 22 for securing the mount 12 to the rifle R, as described further below. As illustrated, nut 23 is oversized and includes a roughened sidewall to allow for easy grasping. Adhesive-backed pads 13 are secured to the upper surface of the plate serving as the mount 12 in this embodiment to prevent it from marring the grip G, which is commonly fabricated of wood or other relatively soft materials.

In this most preferred embodiment, the slot 20 in the plate forming the mount 12 includes a keyway portion for receiving the extender 22. More specifically, when the flat side faces of the extender 22 are aligned with the sidewalls of the slot 20 in the keyway portion, the extender can move into an inner, oversized portion of the slot 20. As should be appreciated, this oversized portion allows the mount 12 to rotate about the extender 22 to achieve proper alignment between the contoured upper surface and the grip G. However, unless the flat side faces align and register with the inside faces of the slot 20, the extender 22 remains trapped in the oversized portion and cannot be inadvertently removed.

Once the contoured upper surface of the mount 12 is properly aligned, the nut 23 is manually tightened down along the extender 22 to positively secure the mount in place against the grip G. Advantageously, this arrangement is reversible, since the mounting assembly 10 may be installed on the rifle R or other firearm from the right or left hand sides, as may be desired depending on the location of the camera controls. Alternatively, the slot 20 may be provided in the opposite side of the plate forming mount 12 (not shown).

As best shown in the exploded view of FIG. 2, a pair of transverse channels 24,26 are formed in the mount 12 for receiving the upper portions of the swing arms 14, 16 forming the parallelogram linkage of the most preferred embodiment. These channels 24,26 provide a bearing surface and allow the journaled portions of the swing arms 14, 16 to freely rotate or pivot therein. Fasteners, such as split locking collars having tangential set screws (not shown) or conventional locking collars 28 with radial set screws 29, are used to secure the swing arms 14, 16 to the plate forming the mount 12 in this first embodiment. As should be appreciated, these locking collars 28 serve to securely hold the swing arms 14, 16 in place, but do not hinder their ability to freely rotate in the channels 24, 26.

From the journaled portions, the swing arms 14, 16 extend outwardly, depend downwardly and then project inwardly to form a C-shape. The ends of the inwardly projecting portions of the swing arms 14, 16 are rotatably or pivotally mounted in transversely extending channels 30, 32 formed in the camera support 18. This camera support 18 is fixed in position on the lower portion of the swing arms 14, 16 by fasteners, such as conventional locking collars 28 and cooperating radial set screws 29. Similar to the arrangement described above for the mount 12, the collars 28 capture the respective portions of the swing arms 14, 16 in the respective channels 30, 32, but do not interfere with the rotation or pivoting of the swing arms 14, 16. Thus, in the mounted position, the swing arms 14, 16 are maintained substantially parallel to each other with the ends of each freely rotating in the respective channels 24, 26 and 30, 32. Of course, this rotation allows the camera support 18 to swing to and fro as desired, while remaining substantially aligned with the line-of-sight of the rifle R or other firearm at all times.

The camera support 18 also includes a slot 34 for receiving a mount for the camera, as described further below. In the preferred embodiment, an adhesive-backed foam pad 18a overlies the upper surface of the platform forming the camera support 18. This pad 18a serves as a cushion for the underside of the video camera VC in the mounted position (see FIG. 4). A slot is provided in this pad 18a that corresponds to slot 34.

While the swinging of the support 18 advantageously translates the rearwardly acting recoil force into swinging motion that is not particularly harmful to the camera, excessive swinging can of course have a deleterious effect on the capture of the shoot on film. Thus, to stabilize the swing arms 14, 16 and substantially reduce the swinging motion created by the recoil force, a damper is provided. In the preferred embodiment, the damper includes first and second extension springs 40, 42 that extend between the swing arms 14, 16 and the mounting plate 18. More specifically, swing arm 14 is provided with one or more threaded apertures 44 for receiving a corresponding threaded stud 46 carrying a locking spacer nut 48. The stud 46 receives and holds the free end of the first tension spring 40 in place on the swing arm 14. The opposite end of the first extension spring 40 is attached in a corresponding aperture formed in a plate 49. This plate 49 is secured to a threaded stud or bolt 50 projecting from a transverse bore (not shown) formed in the side of the support 18.

Of course, a similar arrangement may be provided on swing arm 16, which may be identical to swing arm 14. However, in the most preferred embodiment, swing arm 16 is height-adjustable to ensure that the support 18 is properly aligned with the line of sight of the weapon or other firearm. Specifically, the swing arm 16 is segmented and includes an upper portion 16a and a lower portion 16b. Both portions 16a, 16b are L-shaped and have corresponding threaded ends that are interconnected by a similarly threaded coupler 52. As should be appreciated, by rotating the coupler 52 either clockwise or counterclockwise, the lower portion of the swing arm 16b may be moved toward or away from the upper portion 16a. Increasing or decreasing the overall length of the swing arm 16 in this manner while the front swing arm 14 remains at a fixed length permits the angular position of the camera support 18 to be adjusted relative to the line of sight of the weapon/firearm. This adjustability is of particular benefit when the mounting assembly 10 is used on firearms having grips G with different rearward slopes or other structures that prevent the support 18 from remaining aligned with the line-of-sight of the weapon/firearm or as otherwise desired. Threaded collars or nuts 51 positioned in abutment with the upper and lower surfaces of the coupler 52 ensure that it remains captured in the desired position.

To secure the second tension spring 42 to the adjustable swing arm 16, a washer 54 having a peripheral aperture 56 is provided above the coupler 52. The upper free end of the second spring 42 is inserted in aperture 56, while the opposite free end is also attached to the plate 49 carried on the threaded stud or bolt 50 extending transversely from the support 18. A nut 58 above the upper nut 51 allows the vertical position of the washer 54 along the swing arm 16 to be adjusted, and an optional upper nut 57 serves to hold the washer 54 in place. By moving these nuts 57, 58, any necessary adjustments can be made to fine tune the extension of the second tension spring 42, with the goal of ensuring that substantially equal damping force is provided to properly counteract the swinging motion and minimize distortion.

As should now be appreciated, the plurality of threaded apertures 44 also allow for adjustments to be made to the extension of the first spring 40 to also fine tune the damping function provided. For instance, by placing the stud 46 into a higher aperture 44 (see FIGS. 1 and 2), the spring 40 may be extended as necessary to increase the damping and compensate for height adjustments made to the rear swing arm 16 to adjust to a particular grip slope.

An adjustable mount 60 is also provided for attaching the camera to the support 18. In the preferred embodiment, the mount includes a shank 62 having two threaded side faces and two opposed flat faces. The shank 62 includes a threaded bore for receiving an adaptor 64 for insertion in the tripod bore of the camera. A jam nut 66 is provided on the upper portion of the adaptor 64 for abutting with the camera to hold it in the desired position along the shank. A nut 68 is also secured to the lower portion of the shank 62 for abutting with the underside of the support 18. As with nut 23, the nut 68 is preferably oversized with a roughened sidewall to facilitate grasping and tactile manipulation, which avoids the need for tools during installation or to make any necessary adjustments.

To install the mount on the camera, the adaptor 64 is secured in the tripod bore commonly found on the underside of a camera, and in particular a "palm" sized video camera VC (see FIG. 4). The upper jam nut 66 is then moved into an abutment with the camera and the free end of adaptor 64 is secured in the shank 62. The flat side faces of the shank 62 are aligned with the sidewalls of the slot 34 in the camera support 18 and slid into place. The camera is then aligned along the adaptor 64 and the upper jam nut 66 is tightened down to secure it in the desired position. Once the desired alignment is achieved, the lower nut 68 is threaded down against the support 18 to secure the camera in position against the cushion 18a.

As should be appreciated, if the camera is properly centered, but is skewed slightly due to the slope of the grip G, the coupler 52 on swing arm 16 may be rotated to adjust the angular position of the camera support 18. Upon achieving proper alignment, the collars or nuts 51 are tightened down against the upper and lower ends of the coupler 52 to ensure that it remains held in the desired position.

To remove the camera from the support 18, the lower nut 68 is released and the mount 60 slid from the slot 34. As should be appreciated, the mount 60 can remain installed on the camera, with the jam nut 66 ensuring that the previously determined position is maintained. To reinstall the camera, the mount 60 is simply slid into the slot 34 and locked in place using the lower nut 68. The alignment is memorized and, thus, no significant adjustment is necessary when the camera is returned to the support.

In operation, and in accordance with the related method disclosed herein, the support 18 initially moves forward due to the rearwardly acting recoil force when the weapon or firearm is discharged. As this occurs, the second spring 42 attached to the rear swing arm 16 expands to resist the forward motion of the support 18, while the forward spring 40 compresses. As the rear spring 42 then recompresses after resisting the rearward force and the forward spring 40 expands, the momentum of the support 18 is shifted rearwardly. The rearward spring 42 then compresses and the forward spring 40 expands to prevent the support 18 from moving in the rearward direction. Thus, the resilient springs 40, 42 acting in concert advantageously absorb the swinging motion induced on the plate 18 by the recoil force. This ensures that the target is captured on film with a minimum of camera movement and distortion, while also preventing shock damage to the camera.

FIGS. 4 and 4a illustrate an alternate mount 12 for use on firearms, and in particular, a shotgun SG having an end cap 80. The mount 12 includes a mounting plate 82 for receiving the ends of the swing arms 14, 16, as described in detail above, and a transverse slot (not shown) substantially similar to slot 20 described above, but with or without a keyway and oversized inner portion. An upstanding adaptor 84 includes a U-shaped upper surface for engaging the barrel of the shotgun SG (see FIG. 4). A cushion (not shown) or other type of pad is provided on this U-shaped surface to prevent the adapter 84 from marring the barrel of the shotgun SG. A center channel 86 in the adaptor 84 receives the end cap 80 such that the circumferential flange on the cap seats against a similarly shaped peripheral recess formed in the adaptor and surrounding the channel. A bolt 88 is passed through an aperture (not shown) in the end cap 80 and secured in place by a nut 90, with an optional washer 91 interposed between the two. The end cap 80 is then returned to the shotgun SG. The adaptor 84 is then placed over the portion of the bolt 88 projecting from the end cap 80, and a second nut 92 is threaded down against the adaptor to secure it in place. The slot in the mounting plate 82 is then slid down over a threaded stud 93 depending from the adaptor 84, which may also include a replacement sling stud S'. A nut (not shown), preferably similar to nut 23, is threaded onto this stud 93 to secure the plate 82 to the adaptor 84.

A second alternate "tube" mount 12 is shown in FIGS. 5 and 5a. In this mount 12, a similar mounting plate 82 is provided for receiving the ends of the swing arms 14, 16. The adaptor 94 in this embodiment includes a center aperture 95 defined on one side by a removable side portion 96 held to the main body of the adaptor 94 by a pair of transverse bolts 98. To install this adaptor 94 on the shotgun SG, the threaded end of the tube 100 is removed, the adaptor 94 is placed over the exposed tube, and the removable side portion 96 is secured in place. The end of the tube 100 is then replaced, and the depending stud 102 projecting from the adaptor 94 inserted in the corresponding slot in the mounting plate 82 and a corresponding threaded nut (not shown) tightened down to hold it in place. As illustrated, the depending stud 102 may also include a replacement sling stud S'.

Yet another type of mount 12 is shown in FIG. 6. This mount 12 includes a rearwardly projecting mounting stud 104 for insertion in a corresponding bore in a bow B (as shown in dashed-line outline in FIG. 6), crossbow, or like object. In one possible embodiment, this mount 12 is formed in two sections: (1) a first, forward portion 106 that includes channels 24, 26 for receiving an upper end portion of the swing arms 14, 16; and (2) a second, rear portion 108 that carries the mounting stud 104. The second portion 108 also carries a pivot pin 110 that corresponds to an aperture in an arm 112 projecting from the first portion 106 and a threaded fastener, such as a thumb screw 114 having a shaft that corresponds to a slot 116 in the arm 112. Preferably, both sections have a very low profile to avoid interfering with the ability of the hunter to properly line up his or her shots when in use on a bow.

To secure this mount 12 to the bow B or like object, the stud 104, which is preferably threaded, is inserted in the corresponding bore in the bow B and the second portion 108 is rotated until it is properly seated. Spacers, such as washers or nuts, may be provided as necessary. The aperture in the arm 112 is then slid over the pivot pin 110 while the first portion 106 of the mount 12 is held at an angle to the second portion 108 (see the dashed line outline in FIG. 6). The first portion 106 is then lowered such that the slot 106 is seated on the shaft of the thumb screw 114 (see action arrow E in FIG. 6). The thumb screw 114 is then tightened down to hold the two portions of the mount 12 securely together. As should be appreciated, this arrangement greatly facilitates mounting, since the second portion 108 may be secured in place independent of the mounting assembly 10, which is then manually installed with a minimum amount of effort. Also, this allows for the mounting assembly 10 to be fully removed from the bow B as desired when it is not needed, but the second portion 108 may be left in place. This also facilitates transferring the mounting assembly 10 to other bows, such as when only a single camera is being shared by several hunters in a group.

The foregoing description of a preferred embodiment of the mounting assembly of the present invention has been presented for purposes of illustration and description. It is not intended to be exhaustive or to limit the invention to the precise form disclosed. Obvious modifications or variations are possible in light of the above teachings. For example, the damping mechanism could be connected between the swing arms 14, 16 and the mounting plate, rather than between the swing arms 14, 16 and the support 18 as shown and described. Additionally, the damping mechanism could take other forms, including: (1) providing a resilient or elastic web (or webs) of material between the swing arms 14, 16; or (2) placing a high friction bushing or torsion spring in either or both of the channels 24, 26 in the mount 12 or the channels 30, 32 in the camera support 18. The embodiments described above were chosen and described to provide the best illustration of the principles of the invention and its practical applications to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An assembly for mounting a camera to a structure, comprising:
   a mount for attachment to the structure;
   a camera support; and
   a pair of depending swing arms extending between said mount and said camera support and forming a parallelogram linkage,
      whereby said at least one swing arm allows said camera support to swing to and fro while keeping a line of sight of the camera substantially parallel to the mount at all times.

2. The camera mounting assembly according to claim 1, further including a damper associated with at least one of said pair of swing arms to assist in resisting the swinging motion of said support.

3. The camera mounting assembly according to claim 1, wherein said damper includes at least one spring extending between one of said pair of swing arms and said support, whereby said at least one spring dampens the ability of the camera support to swing to and fro.

4. The camera mounting assembly according to claim 1, wherein said camera support includes a slot for receiving a mounting subassembly carried by the camera.

5. The camera mounting assembly according to claim 4, wherein said mounting subassembly is adjustable to ensure that the camera is properly aligned.

6. An assembly for mounting a camera to a weapon to reduce the effects of recoil and shock forces upon discharge, comprising:
   a mount for attachment to the weapon;
   a camera support; and
   first and second swing arms extending between said mount and said camera support;
      whereby said swing arms maintain the camera and said support aligned with the line-of-sight of the weapon at all times and translate the recoil force acting upon the camera and said support upon discharge of the weapon into swinging motion.

7. The camera mounting assembly according to claim 6, wherein said weapon is a rifle having a grip and a projecting stud and said mount includes a mounting plate having a contoured upper surface for engaging said grip and a transverse slot for receiving said projecting stud.

8. The camera mounting assembly according to claim 6, wherein said mount includes:
   a mounting plate having a channel for receiving each of said swing arms and a transverse slot;
   an adaptor for attachment to said mounting plate, said adaptor including a body having an aperture for receiving an end cap carried by a grip on a firearm, a contoured upper surface for abutting with a barrel on the firearm, and a depending stud for insertion in said transverse slot in said mounting plate;
   a fastener for attachment to said depending stud to hold said adaptor on said mounting plate.

9. The camera mounting assembly according to claim 6, wherein said mount includes:
   a mounting plate having a pair of channels for receiving a first end of each of said swing arms and a transverse slot;
   an adaptor for attachment to said mounting plate, said adaptor including a body having a removable side portion partially defining an aperture for receiving a similarly shaped tube-like structure on the weapon and a depending stud for insertion in said transverse slot in said mounting plate;
   a fastener for attachment to said depending stud to hold said adaptor on said mounting plate.

10. The camera mounting assembly according to claim 6, wherein said mount includes a projecting stud for insertion in a corresponding bore in the weapon, whereby said mount is held in a cantilevered position relative to the weapon.

11. The camera mounting assembly according to claim 6, wherein said mount includes:
   a first member having a projecting stud for insertion in a corresponding bore formed in a bow, said first member carrying a pivot pin and having an aperture formed therein;

a fastener including a shank having an end for insertion in said aperture; and a second member having an aperture for receiving said pivot pin projecting from said first member and a slot for receiving a portion of the shank of said fastener.

12. The apparatus according to claim 6, wherein a damper is provided for resisting the swinging motion of said camera and support, whereby said damper absorbs substantially all of the recoil force created when the weapon is discharged.

13. The camera mounting assembly according to claim 12, wherein said damper includes:

a first spring extending between said first swing arm and said camera support; and a second spring extending between said second swing arm and said camera support;

whereby said first and second springs dampen the tendency for said swing arms, and hence the camera and camera support, to swing to and fro when the weapon is discharged.

14. An apparatus for capturing the discharge of a weapon on film, comprising:

a camera;

a mounting plate for attachment to the weapon;

a camera support;

a parallelogram linkage extending between said mounting plate and said camera support, said linkage permitting said camera and said support to swing to and fro when the weapon is discharged; and a damper for engaging said parallelogram linkage and dampening the ability of said camera and said support to swing to and fro when the weapon is discharged.

15. The camera mounting assembly according to claim 14, wherein said parallelogram linkage includes first and second swing arms.

16. The camera mounting assembly according to claim 15, wherein said damper includes:

a first spring extending between said first swing arm and said camera support; and a second spring extending between said second swing arm and said camera support;

whereby said first and second springs dampen the tendency for said swing arms and said support to swing to and fro when the weapon is discharged.

17. A method of reliably capturing a single shot or shoot on films comprising:

mounting a camera to a weapon such that the camera swings to and fro along an arcuate path in response to any force created when the weapon is discharged, while at all times keeping the camera substantially aligned with the line-of-sight of the weapon; and activating the camera to record the shot or shoot.

18. The method according to claim 17, wherein mounting the camera further includes extending a pair of depending swing arms between a mount on the weapon and a support attached to the camera, whereby said swing arms allow the camera and support to swing to and fro when the weapon is discharged.

19. The method according to claim 17, further including damping the swinging motion of the camera to ensure that the shoot is reliably captured on film.

* * * * *

UNITED STATES PATENT AND TRADEMARK OFFICE
CERTIFICATE OF CORRECTION

PATENT NO. : 6,425,697 B1  Page 1 of 1
DATED : July 30, 2002
INVENTOR(S) : Jeff C. Potts and Richard M. Allen It is certified that error appears in the above-identified patent and that said Letters Patent is hereby corrected as shown below:

Column 12,
Line 3, "claim 1" should be -- claim 2 --;

Column 14,
Line 14, "films" should be -- film --.

Signed and Sealed this

Fifth Day of November, 2002

Attest:

JAMES E. ROGAN
Attesting Officer  Director of the United States Patent and Trademark Office